(12) United States Patent
Sip

(10) Patent No.: US 9,618,978 B2
(45) Date of Patent: Apr. 11, 2017

(54) METHODS FOR CONTROLLING A TOUCH PANEL AND PORTABLE COMPUTERS USING THE SAME

(71) Applicant: Acer Incorporated, New Taipei (TW)

(72) Inventor: Kim Yeung Sip, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/470,189

(22) Filed: Aug. 27, 2014

(65) Prior Publication Data
US 2015/0097788 A1    Apr. 9, 2015

(30) Foreign Application Priority Data
Oct. 3, 2013  (TW) .............................. 102135798 A

(51) Int. Cl.
| | | |
|---|---|---|
| *G06F 1/16* | (2006.01) | |
| *G06F 3/041* | (2006.01) | |
| *G06F 1/32* | (2006.01) | |
| *G06F 3/038* | (2013.01) | |
| *G06F 3/0354* | (2013.01) | |

(52) U.S. Cl.
CPC .......... *G06F 1/1677* (2013.01); *G06F 1/3262* (2013.01); *G06F 3/038* (2013.01); *G06F 3/03547* (2013.01); *G06F 3/041* (2013.01); *Y02B 60/32* (2013.01)

(58) Field of Classification Search
CPC .... G06F 1/1616; G06F 1/1677; G06F 1/3287; G06F 1/1601; G06F 1/1615; G06F 1/1643
See application file for complete search history.

(56) References Cited

U.S. PATENT DOCUMENTS

| 8,149,000 | B2 | 4/2012 | Harris et al. | |
|---|---|---|---|---|
| 2010/0182265 | A1 | 7/2010 | Kim et al. | |
| 2011/0005315 | A1* | 1/2011 | Chen | G01C 19/5726 73/504.12 |
| 2012/0038572 | A1* | 2/2012 | Kim | G06F 3/0418 345/173 |
| 2012/0278638 | A1* | 11/2012 | Wang | G06F 1/3206 713/320 |

(Continued)

FOREIGN PATENT DOCUMENTS

| CN | 101788850 | 7/2010 |
|---|---|---|
| CN | 102981791 | 3/2013 |

(Continued)

OTHER PUBLICATIONS

Chinese language office action dated Jun. 24, 2015, issued in application No. 102135798.

(Continued)

*Primary Examiner* — Benjamin C Lee
*Assistant Examiner* — Dong Hui Liang
(74) *Attorney, Agent, or Firm* — McClure, Qualey & Rodack, LLP

(57) ABSTRACT

An embodiment of the invention introduces a method for controlling a touch panel, executed by a micro-controller of a portable computer, which contains at least the following steps. A control signal is outputted to direct a touch panel controller to disable the whole touch panel or a portion thereof before sleep mode is entered.

10 Claims, 7 Drawing Sheets

(56) References Cited

U.S. PATENT DOCUMENTS

| | | | | |
|---|---|---|---|---|
| 2014/0111928 A1* | 4/2014 | Smith | .................. | G06F 1/1616 |
| | | | | 361/679.27 |
| 2014/0191999 A1* | 7/2014 | Kim | ..................... | G06F 1/1616 |
| | | | | 345/173 |
| 2014/0225629 A1* | 8/2014 | Igari | ...................... | G06F 3/044 |
| | | | | 324/662 |

FOREIGN PATENT DOCUMENTS

| | | |
|---|---|---|
| TW | I307835 | 3/2009 |
| TW | 201119340 | 6/2011 |
| TW | I392995 | 4/2013 |

OTHER PUBLICATIONS

Chinese language office action dated Jan. 18, 2017, issued in application No. CN 201410087778.0.

* cited by examiner

# METHODS FOR CONTROLLING A TOUCH PANEL AND PORTABLE COMPUTERS USING THE SAME

CROSS REFERENCE TO RELATED APPLICATIONS

This application claims priority of Taiwan Patent Application No. 102135798, filed on Oct. 3, 2013, the entirety of which is incorporated by reference herein.

BACKGROUND

Technical Field

The present invention relates to touch panel control, and in particular to methods for controlling a touch panel according to an angle between a lid and a body, and portable computers using the same.

Description of the Related Art

A portable computer typically enters a sleep mode when the processor thereof detects that the user has closed the lid. In the sleep mode, the touch panel is disabled to not only save battery power consumption, but also avoid generating unwanted touch signal resulting from the touch panel of the lid contacting the body. However, the system requires a lead time between detecting that the lid is closed and disabling the touch panel completely. The unwanted touch signals are still generated because the touch panel of the lid contacts the body before the touch panel is disabled completely. An application running in the processor may perform tasks in response to the unwanted touch signals, leading to unexpected results. Thus, it is desirable to have methods for controlling touch panels and portable computers using the same to address the aforementioned problem.

BRIEF SUMMARY

An embodiment of the invention introduces a method for controlling a touch panel, executed by a micro-controller of a portable computer, which contains at least the following steps. A control signal is outputted to direct a touch panel controller to disable the whole touch panel or a portion thereof before a sleep mode is entered.

An embodiment of the invention introduces a portable computer, which at least contains a touch panel, a touch panel controller and a micro-controller. The micro-controller outputs a control signal to direct the touch panel controller to disable the whole touch panel or a portion thereof, and entering a sleep mode after outputting the first control signal.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
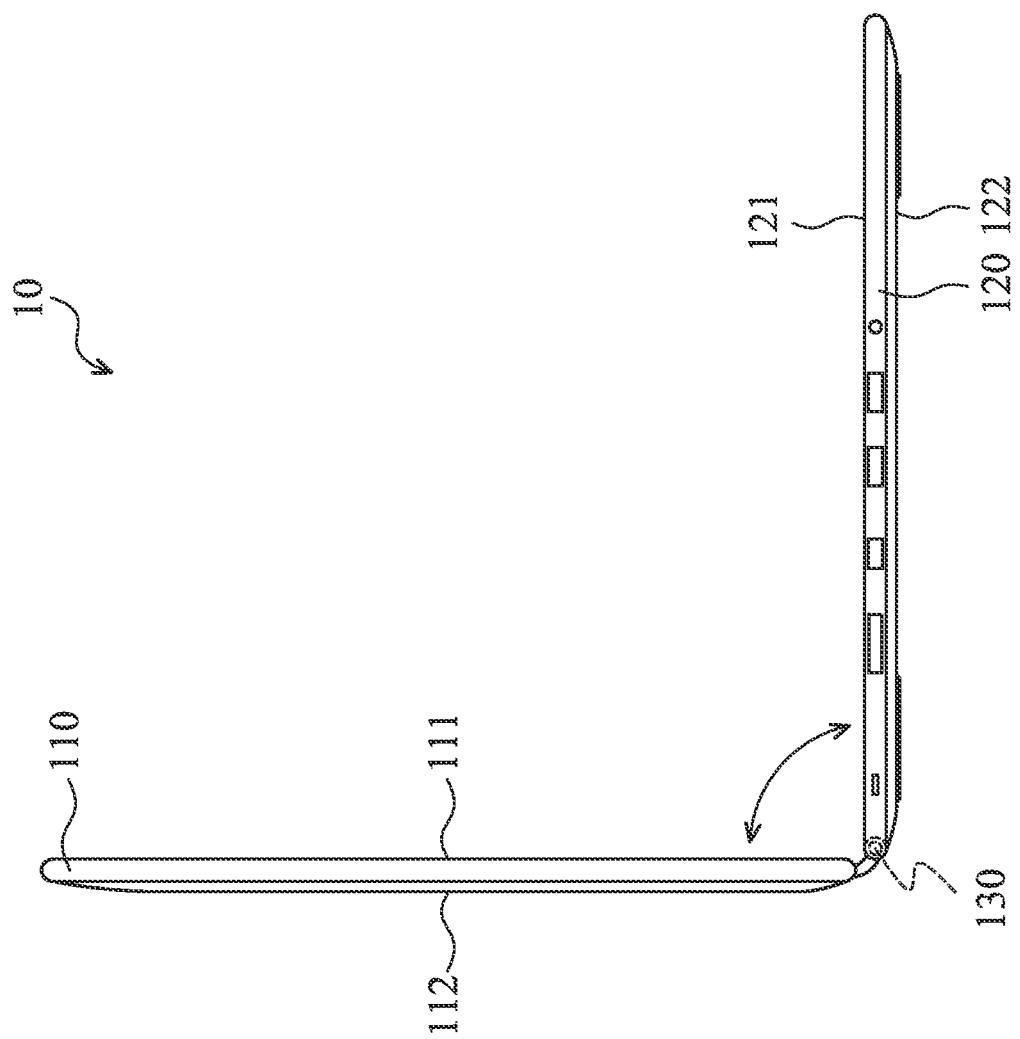
FIG. 1 is a schematic diagram of the appearance of a portable computer according to an embodiment of the invention.

FIG. 1 is a schematic diagram of the appearance of a portable computer according to an embodiment of the invention. The portable computer 10, such as a notebook computer, an ultrabook, etc., contains an upper enclosure 110 and a lower enclosure 120. The upper enclosure 110 at least embodies a touch panel and has a front surface 111 and a rear surface 112. The touch panel may be a capacitive-type touch panel or another capable of detecting a contact or the proximity of a conductive object. The upper enclosure 110 may be referred to as a lid. The lower enclosure 120 at least embodies a keypad and a motherboard and has a front surface 121 and a rear surface 122. The lower enclosure 120 may be referred to as a body. A hinge mechanism 130 is provided to connect the upper and lower enclosures 110 and 120. A closing action is introduced when the front surface 111 of the upper enclosure 110 is moved towards the front surface 121 of the lower enclosure 120. Conversely, an opening action is introduced when the front surface 111 of the upper enclosure 110 is moved away from the front surface 121 of the lower enclosure 120. It should be understood that the aforementioned problem happens frequently when a portion of the front surface 121 of the lower enclosure 120 is made of metal. To address that, embodiments of the invention are introduced to direct a touch panel controller to disable the touch panel before the front surface 111 of the upper enclosure 110 contacts with the front surface 121 of the lower enclosure 120, so as to avoid generating the unwanted touch signals.

Figure 2:
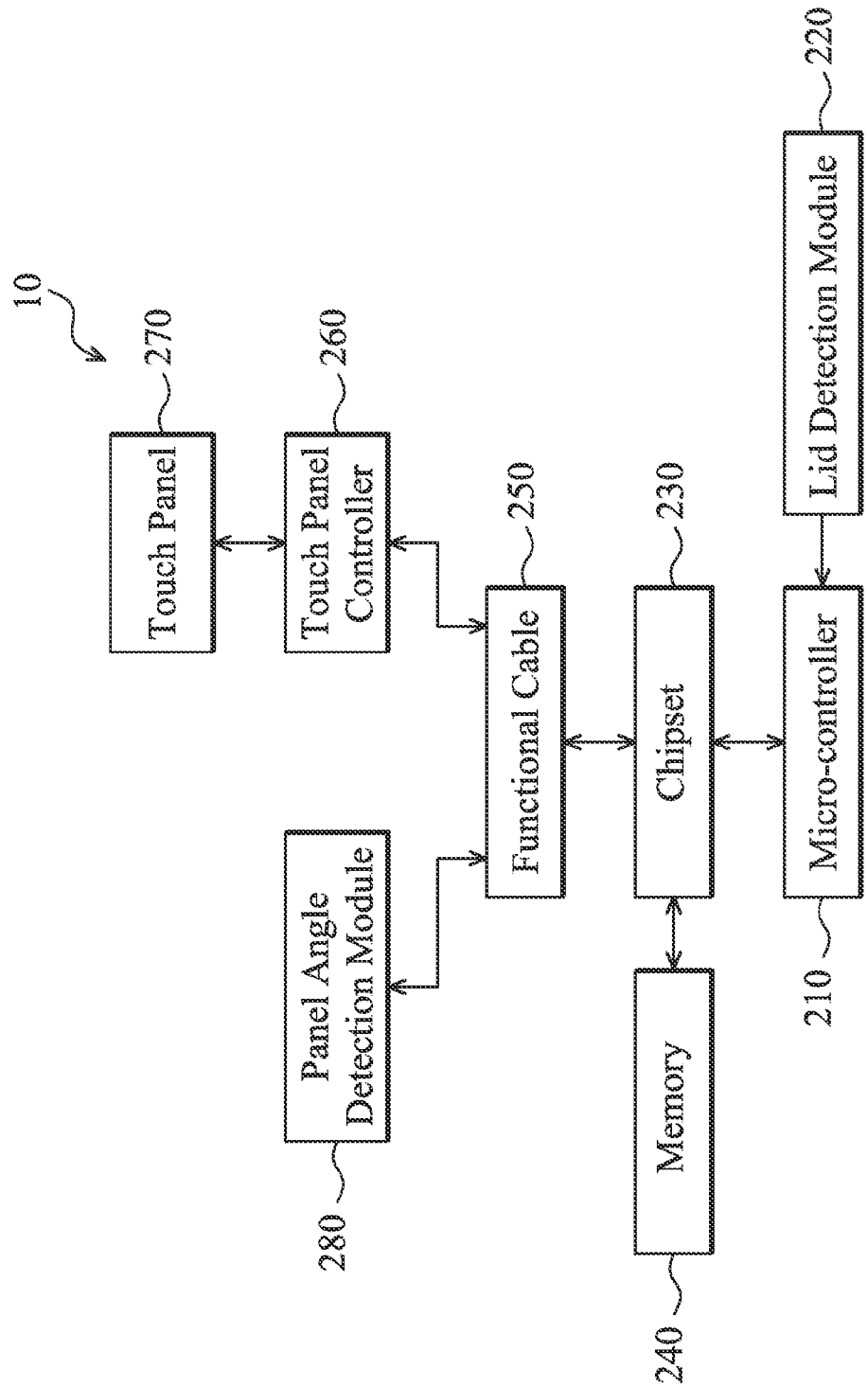
FIG. 2 is a system block diagram of a portable computer according to an embodiment of the invention.

FIG. 2 is a system block diagram of a portable computer according to an embodiment of the invention. The system architecture may at least include a micro-controller 210, a lid detection module 220, a chipset 230, a memory 240, a functional cable 250, a touch panel controller 260, a touch panel 270 and a panel angle detection module 280. The micro-controller 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The touch panel 270 may include a display panel for displaying input letters, alphanumeric characters and symbols, dragged paths, drawings, or screens provided by an application for a user's viewing, such as a TFT-LCD (Thin film transistor liquid-crystal display) panel, an OLED (Organic Light-Emitting Diode) panel, or others. The lid detection module 220 issues a control signal to the micro-controller 210 when detecting that the front surface 111 of the upper enclosure 110 contacts with the front surface 121 of the lower enclosure 120 (i.e. the upper enclosure 110 and the lower enclosure 120 form a closed state), and then, the micro-controller 210 executes relevant instructions for entering the sleep mode to save battery power consumption. The lid detection module 220 may include a mechanical lid switch installed in the lower enclosure 120. The mechanical lid switch is pressed to issue the control signal to the micro-controller 210 when the front surface 111 of the upper enclosure 110 contacts with the front surface 121 of the lower enclosure 120. Alternatively, the lid detection module 220 may include a magnet installed in the upper enclosure 110 and a Hall sensor installed in a corresponding position of the lower enclosure 120. The Hall sensor generates the control signal to the micro-controller when detecting that the magnetic field varies resulting from the magnet of the upper enclosure 110 being close to the lower enclosure 120.

The chipset 230 may be an Intel® platform controller hub for accessing high-speed I/O devices including but not limited to the memory 240, and accessing low-speed I/O devices via the functional cable 250, including but not limited to the touch panel controller 260 and the panel angle detection module 280. The panel angle detection module 280 is configured to inspect a panel angle between the front surface 111 of the upper enclosure 110 and the front surface 121 of the lower enclosure 120 and continuously output magnitudes to the micro-controller 210. The micro-controller 210 outputs the control signal via the chipset 230 and the functional cable 250 to direct the touch panel controller 260 to disable the touch panel 270 when detecting that the surface 111 of the upper enclosure 110 is being moved toward the front surface 121 of the lower enclosure 120 and the current panel angle falls within a range. It requires a lead time, such as 0.5 milliseconds, between outputting the control signal to the touch panel controller 260 and completely disabling the touch panel 270. It should be noted that the moment at which the touch panel controller 260 starts to disable the touch panel 270 is earlier than the control signal received from the lid detection module 220 by the lead time.

Figure 3:
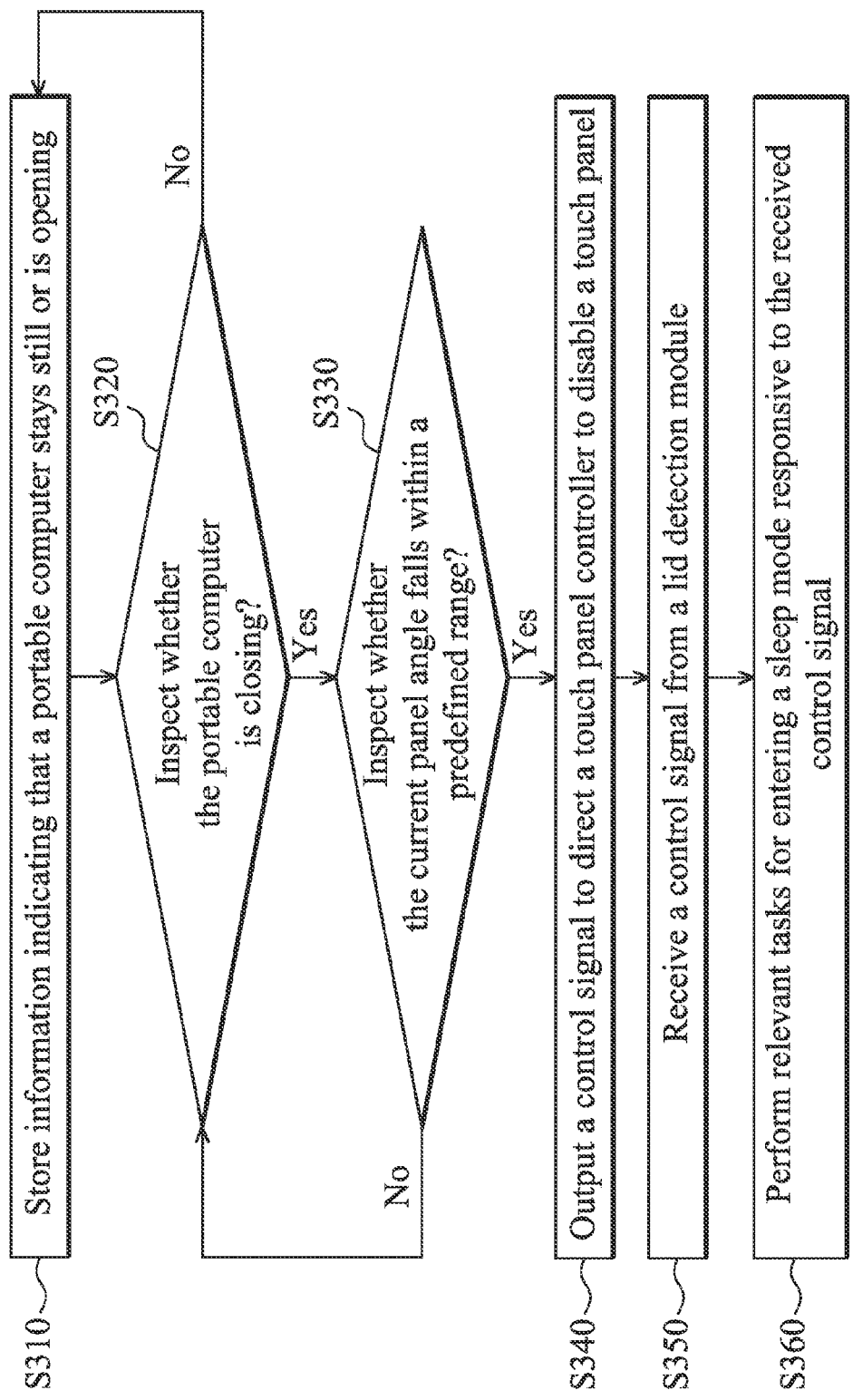
FIG. 3 is a flowchart illustrating a method for controlling a touch panel, performed by a micro-controller when loading and executing a software or firmware, according to an embodiment of the invention.

FIG. 3 is a flowchart illustrating a method for controlling a touch panel, performed by the micro-controller 210 when loading and executing a software or firmware, according to an embodiment of the invention. First, information indicating that the portable computer 10 stays still or is opening is stored (step S310). The information may be stored in the memory 240 to suggest the last inspection outcome. The micro-controller 210 periodically inspects whether the portable computer 10 is closing (step S320), and if not, maintains the information indicating that the portable computer 10 stays still or is opening (step S310). In step S320, the micro-controller 210 may comprehend the magnitudes received from the panel angle detection module 280 to conduct the inspection.

When detecting that the portable computer 10 is closing (the "yes" path of step S320), the micro-controller 210 periodically inspects whether the current panel angle falls within a predefined range (step S330). In step S330, the micro-controller 210 may comprehend the magnitudes received from the panel angle detection module 280 to determine the current panel angle. If the current panel angle does not fall within the predefined range (the "no" path of step S330), then the process loops back to step S320 to conduct a further inspection. If the current panel angle falls within the predefined range (the "yes" path of step S330), then the micro-controller 210 outputs a control signal to direct the touch panel controller 260 to disable the touch panel 270 (step S340). After the aforementioned lead time or longer, the micro-controller 210 receives a control signal from the lid detection module 220 (step S350), and performs relevant tasks for entering a sleep mode responsive to the received control signal (step S360). It should be noted that, when entering the sleep mode, applications run by the micro-controller 210 halt.

Figure 4:
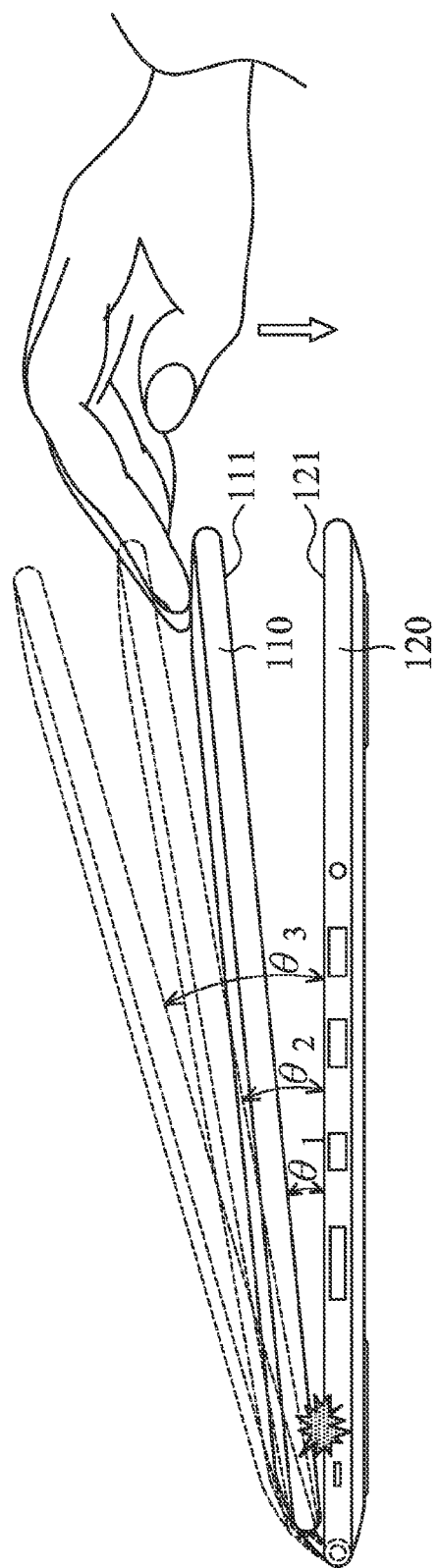
FIG. 4 is a schematic diagram showing that a portable computer is closed.

FIG. 4 is a schematic diagram showing that a portable computer is closed. In this example, when the portable computer 10 is being closed by a user with the current panel angle less than $\theta_1$ and the touch panel 270 works, the touch panel controller 260 is still capable of detecting touch. In order to avoid an application being affected by unwanted touch signals, the predefined range may be configured to $\theta_2$ to $\theta_3$. The micro-controller 210 outputs a control signal to direct the touch panel controller 260 to disable the touch panel 270 when inspecting that the current panel angle falls within the predefined range. The angle $\theta_2$ is the lower boundary of the predefined range and may be obtained in extensive experiments. Specifically, it guarantees that, even in the worst case, the touch panel 270 can be completely disabled before the current panel angle reaches $\theta_1$ if the control signal is outputted to the touch panel controller 260 before the current panel angle reaches $\theta_2$. For example, $\theta_1$, $\theta_2$ and $\theta_3$ may be set to 10, 15 and 25 degrees, respectively. In some embodiments, the lid detection module 220 may be configured to output a control signal to the touch panel controller 260 when the current panel angle is less than 3 degrees. Although the embodiments have been described with specific predefined degrees, it is noted that these are merely examples, and the invention is equally applicable to systems having other predefined values for $\theta_1$, $\theta_2$ and $\theta_3$ associated with a hover distance.

In an exemplary case, the panel angle detection module 280 consists of two gyro sensors installed in the upper enclosure 110 and the lower enclosure 120, respectively. The micro-controller 210 may read magnitudes outputted from the gyro sensors to conduct the inspections recited in steps S320 and S330. In another exemplary case, the panel angle detection module 280 comprises only one gyro sensor, installed the upper enclosure 110. The micro-controller 210 assumes that the lower enclosure 120 of the portable computer 10 is placed parallel to the ground: The inspections recited in steps S320 and S330 are conducted according to magnitudes outputted from the gyro sensor installed in the upper enclosure 110. In still another exemplary case where the panel angle detection module 280 consists of a rotation angle detector installed in the hinge mechanism 130. The micro-controller 210 may perform the inspections recited in steps S320 and S330 according to magnitudes indicating an angle between the upper enclosure 110 and the lower enclosure 120 outputted from the rotation angle detector. In the other exemplary case where the panel angle detection module 280 may be integrated into the mechanical lid switch installed in the lower enclosure 120. For example, the upper enclosure 110 presses the mechanical lid switch by a first distance when the panel angle reaches $\theta_2$, forcing the mechanical lid switch to issue a control signal to the micro-controller 210. Upon receiving the first control signal from the mechanical lid switch, the micro-controller 210 outputs a control signal to direct the touch panel controller 260 to disable the touch panel 270. The upper enclosure 110 presses the mechanical lid switch by a second distance when the panel angle reaches $\theta_1$, forcing the mechanical lid switch to issue a control signal to the micro-controller 210 again. Upon receiving the second control signal from the mechanical lid switch, the micro-controller 210 performs the relevant tasks to enter sleep mode. The aforementioned control in two phases may be modified to apply to an exemplary case where the panel angle detection module 280 is integrated with the Hall sensor of the lid detection module 220.

The exemplary panel angle $\theta_2$ may be a predefined constant, or may vary with the closing speed forced by the user. The panel angle $\theta_2$ may be calculated using the equation:

$$\theta_2 = \theta_1 + \omega_0 t_1 + \frac{1}{2}\alpha t_1^2 \quad (1)$$

where $\omega_0$ indicates an acceleration magnitude which is first detected from a stationary position by the gyro sensor(s), $\alpha$ indicates the last acceleration magnitude detected by the gyro sensor(s), and $t_1$ is a predefined constant indicating a lead time between receiving a control signal by the touch panel controller 260 and completely disabling the touch panel 270.

Figure 5:
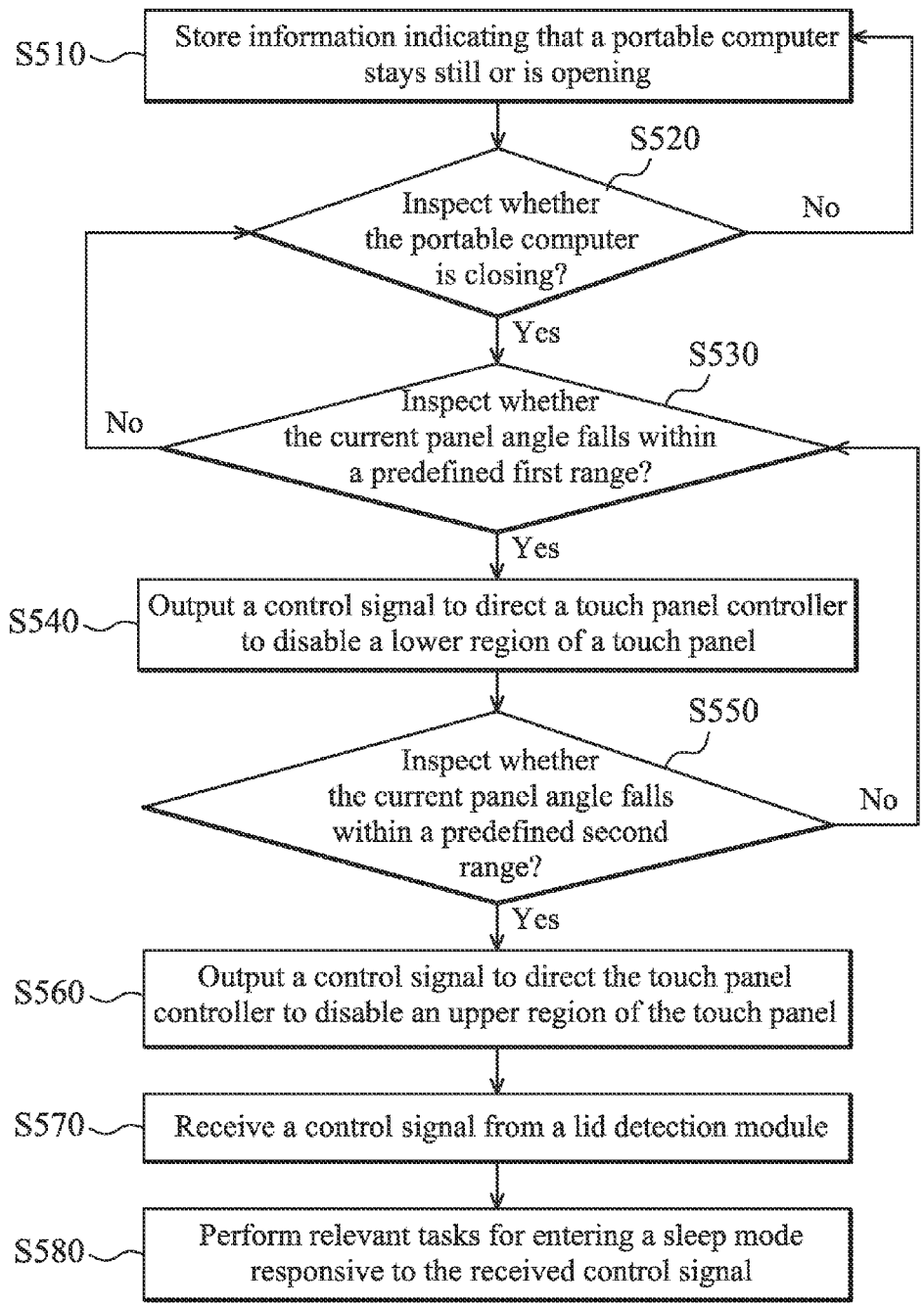
FIG. 5 is a flowchart illustrating a method for controlling a touch panel in two stages, performed by a micro-controller when loading and executing a software or firmware, according to an embodiment of the invention.
Figure 6:
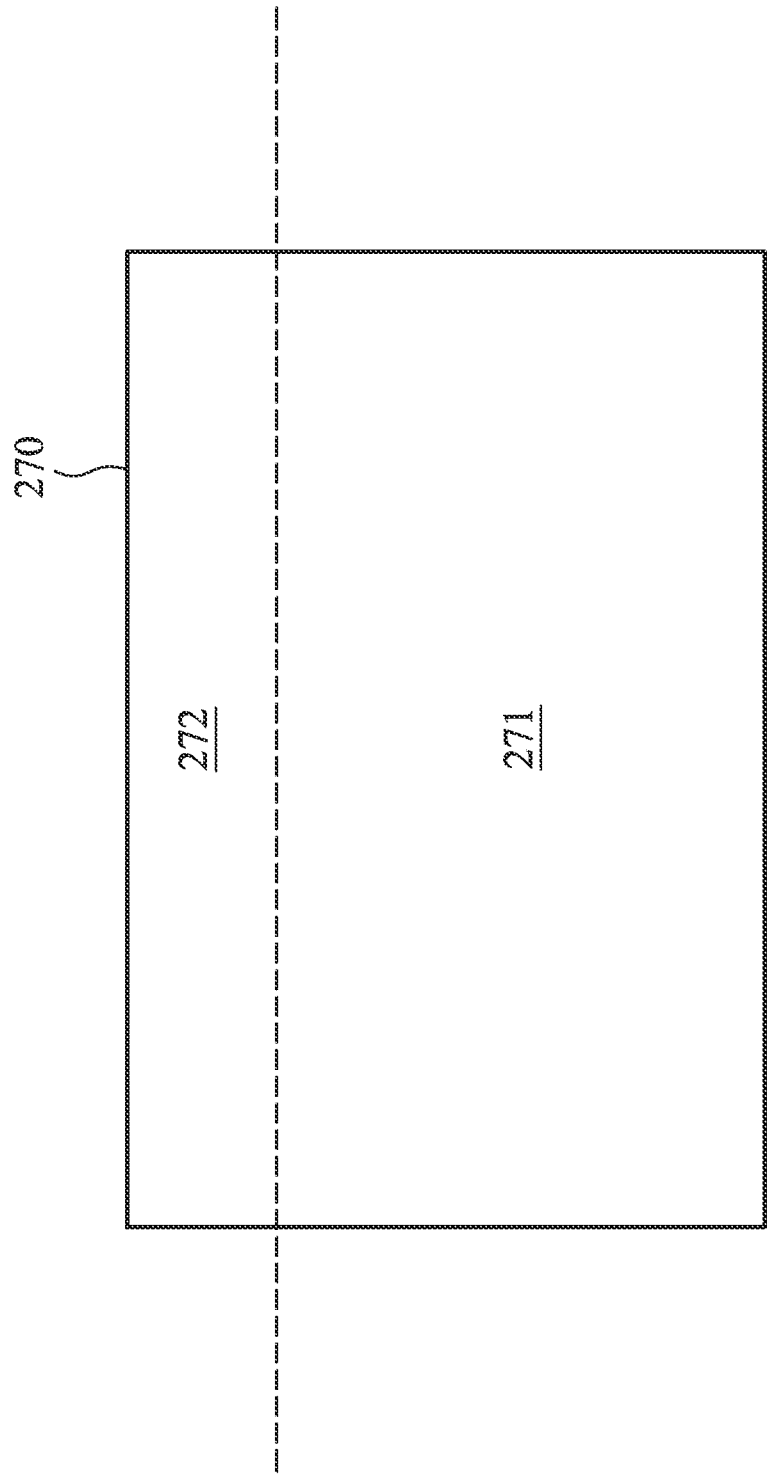
FIG. 6 is a schematic diagram illustrating a touch panel according to an embodiment of the invention.

FIG. 5 is a flowchart illustrating a method for controlling a touch panel in two stages, performed by the micro-controller 210 when loading and executing software or firmware, according to an embodiment of the invention. FIG. 6 is a schematic diagram illustrating a touch panel according to an embodiment of the invention. The touch panel 270 is divided into an upper region 272 and a lower region 271. The control flow described below can disable the upper region 272 or the lower region 271 of the touch panel 270 separately. First, information indicating that the portable computer 10 stays still or is opening is stored (step S510). The information may be stored in the memory 240 to suggest the last inspection outcome. The micro-controller 210 periodically inspects whether the portable computer 10 is closing (step S520), and if not, it maintains the information indicating that the portable computer 10 stays still or is opening (step S510). In step S520, the micro-controller 210 may comprehend the magnitudes received from the panel angle detection module 280 to conduct the inspection.

When inspecting that the portable computer 10 is closing (the "yes" path of step S320), the micro-controller 210 periodically inspects whether the current panel angle falls within a first predefined range (step S530). In step S530, the micro-controller 210 may comprehend the magnitudes received from the panel angle detection module 280 to determine the current panel angle. If the current panel angle does not fall within the first predefined range (the "no" path of step S530), then the process loops back to step S520 to conduct a further inspection. If the current panel angle falls within the first predefined range (the "yes" path of step S530), then the micro-controller 210 outputs a control signal to direct the touch panel controller 260 to disable the lower region 271 of the touch panel 270 (step S540). Details of the first predefined range may be referred to in the description of the panel angles $\theta_2$ to $\theta_3$, and are omitted herein for brevity.

Subsequently, for the upper region 272 of the touch panel 270 to still work, the process proceeds to inspect whether the current panel angle falls within a second predefined range (step S550). In step S550, the micro-controller 210 may comprehend the magnitudes received from the panel angle detection module 280 to determine the current panel angle. If the current panel angle does not fall within the second predefined range (the "no" path of step S550), then the process loops back to step S530 to conduct a further inspection. If the current panel angle falls within the second predefined range (the "yes" path of step S550), then the micro-controller 210 outputs a control signal to direct the touch panel controller 260 to disable the upper region 272 of the touch panel 270 (step S560). After the aforementioned lead time or longer, the micro-controller 210 receives a control signal from the lid detection module 220 (step S570), and performs relevant tasks for entering a sleep mode in response to the received control signal (step S580). It should be noted that, when entering the sleep mode, applications run by the micro-controller 210 halt.

Figure 7:
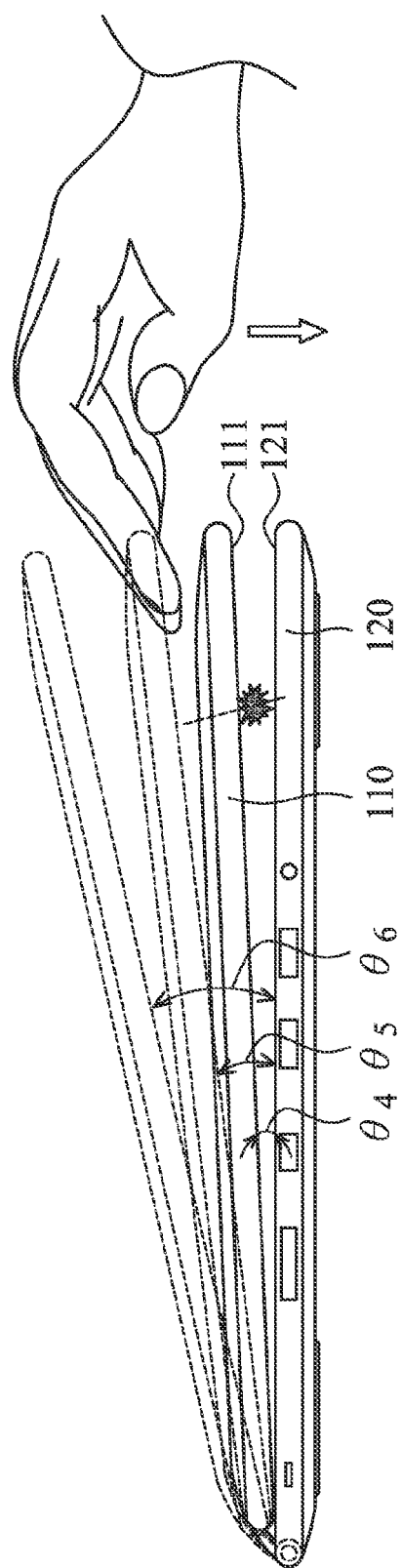
FIG. 7 is a schematic diagram showing that a portable computer is closed.

FIG. 7 is a schematic diagram showing that a portable computer is closed. In this example, when the portable computer 10 is being closed by a user with the current panel angle less than $\theta_4$ and the upper region 272 of the touch panel 270 works, the touch panel controller 260 is still capable of detecting any touches. In order to avoid an application being affected by the unwanted touch signals, the second predefined range recited in step S550 may be configured to $\theta_5$ to $\theta_6$. The panel angle $\theta_4$ is less than the panel angle $\theta_1$ as shown in FIG. 4. The panel angle $\theta_6$ may be configured to the panel angle $\theta_3$ as shown in FIG. 4. The micro-controller 210 outputs a control signal to direct the touch panel controller 260 to disable the upper region 272 of the touch panel 270 when inspecting that the current panel angle falls within the second predefined range. The angle $\theta_5$ is the lower boundary of the second predefined range and may be obtained in extensive experiments. Specifically, it guarantees that, even in the worst case, the upper region 272 of the touch panel 270 can be completely disabled before the current panel angle reaches $\theta_4$ if the control signal is outputted to the touch panel controller 260 before the current panel angle reaches $\theta_5$. For example, $\theta_4$, $\theta_5$ and $\theta_6$ may be set to 5, 10 and 20 degrees, respectively. In some embodiments, the lid detection module 220 may be configured to output a control signal to the touch panel controller 260 when the current panel angle is less than 3 degrees. Although the embodiments have been described with specific predefined degrees, it is noted that these are merely examples, and the invention is equally applicable to systems having other predefined values of $\theta_4$, $\theta_5$ and $\theta_6$ associated with a hover distance.

The inspection whether the portable computer 10 stays still, or is being closed or opened recited in step S520, and the inspections of a panel angle recited in steps S530 and S550 may employ the aforementioned gyro sensor(s), rotation angle detector, mechanical lid switch, Hall sensor or other similar but different electronic devices.

The exemplary panel angle θ2 may be calculated by the equation (1) and t1 is modified to indicate a lead time between receiving a control signal by the touch panel controller 260 and completely disabling the lower region 271 of the touch panel 270. The exemplary panel angle θ5 may be a predefined constant, or may vary with a closing speed forced by an user. The panel angle θ5 may be calculated using the equation:

$$\theta_5 = \theta_4 + \omega_0 t_2 + \frac{1}{2}\beta t_2^2 \qquad (2)$$

where ω0 indicates an acceleration magnitude which is first detected from a stationary position by the gyro sensor(s), β indicates the last acceleration magnitude detected by the gyro sensor(s), and t2 is a predefined constant indicating a lead time between receiving a control signal by the touch panel controller 260 and completely disabling the upper region 272 of the touch panel 270.

Although the embodiment has been described as having specific elements in FIG. 2, it is noted that additional elements may be included to achieve better performance without departing from the spirit of the invention. While the process flows described in FIG. 3 and FIG. 5 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a touch panel, executed by a micro-controller of a portable computer having a body comprising an upper enclosure closable with a cooperating hinged lower enclosure, the upper enclosure acting as a lid and comprising a display screen having the touch panel facing the lower enclosure, the portable computer further comprising a touch panel controller, the method comprising:
    outputting a first control signal to direct the touch panel controller to disable a lower region of the touch panel responsive to detecting that the upper enclosure is moved toward the lower enclosure and the panel angle between the upper enclosure and the lower enclosure falls within a first predefined range;
    outputting a second control signal to direct the touch panel controller to disable an upper region of the touch panel responsive to detecting that the upper enclosure is moved toward the lower enclosure and the panel angle between the upper enclosure and the lower enclosure falls within a second predefined range, wherein the first predefined range is greater than the second predefined range; and
    entering a sleep mode subsequent to
    completely disabling the lower region of the touch panel.

2. The method of claim 1, wherein the step for entering the sleep mode further comprises:
    entering the sleep mode when receiving a second control signal from a lid detection module.

3. The method of claim 1, wherein:
    detecting that the upper enclosure is moved toward the lower enclosure, and the panel angle between the upper enclosure and the lower enclosure falls within the first and second predefined ranges, are done according to magnitudes received from a panel angle detection module.

4. A portable computer, comprising:
    a body comprising an upper enclosure closable with a cooperating hinged lower enclosure, the upper enclosure acting as a lid and comprising a display screen having a touch panel facing the lower enclosure;
    a touch panel controller, coupled to the touch panel; and
    a micro-controller, coupled to the touch panel controller,
        outputting a first control signal to direct the touch panel controller to disable a lower region of the touch panel responsive to detecting that the upper enclosure is moved toward the lower enclosure and a panel angle between the upper enclosure and the lower enclosure falls within a first predefined range,
        outputting a second control signal to direct the touch panel controller to disable an upper region of the touch panel responsive to detecting that the upper enclosure is moved toward the lower enclosure and the panel angle between the upper enclosure and the lower enclosure falls within a second predefined range, wherein the first predefined range is greater than the second predefined range, and
        entering a sleep mode subsequent to
    completely disabling the lower region of the touch panel.

5. The portable computer of claim 4, further comprising:
    a lid detection module,
    wherein the micro-controller enters the sleep mode when receiving a second control signal from the lid detection module.

6. The portable computer of claim 5, wherein the lid detection module comprises a mechanical lid switch installed in a lower enclosure, or a magnet installed in an upper enclosure and a Hall sensor installed in a lower enclosure.

7. The portable computer of claim 4, wherein a portion of a front surface of a lower enclosure of the portable computer is made of metal.

8. The portable computer of claim 4, further comprising:
    a panel angle detection module,
    wherein the micro-controller detects that the upper enclosure is moved toward the lower enclosure, and the panel angle between the upper enclosure and the lower enclosure falls within the first and second predefined ranges according to magnitudes received from the panel angle detection module.

9. The portable computer of claim 8, wherein the panel angle detection module comprises a gyro sensor installed in the upper enclosure, two gyro sensors installed in the upper enclosure and the lower enclosure respectively, a rotation angle detector installed in a hinge mechanism connecting the upper enclosure and the lower enclosure, a mechanical lid switch installed in the lower enclosure, or a magnet installed in the upper enclosure and a Hall sensor installed in the lower enclosure.

10. The portable computer of claim 4, wherein the micro-controller halts applications when entering the sleep mode.

* * * * *